United States Patent
Hyatt et al.

(10) Patent No.: US 8,612,492 B2
(45) Date of Patent: *Dec. 17, 2013

(54) RELATIONSHIP COLLABORATION SYSTEM

(75) Inventors: Geoffrey Hyatt, Boston, MA (US); Michael Yoon, Philadelphia, PA (US); Wilbur Swan, Lexington, MA (US)

(73) Assignee: West Services, Inc., Eagan, MN (US)

( * ) Notice: Subject to any disclaimer, the term of this patent is extended or adjusted under 35 U.S.C. 154(b) by 274 days.

This patent is subject to a terminal disclaimer.

(21) Appl. No.: 12/914,742

(22) Filed: Oct. 28, 2010

(65) Prior Publication Data

US 2011/0099211 A1 Apr. 28, 2011

Related U.S. Application Data

(63) Continuation of application No. 10/938,406, filed on Sep. 10, 2004, now Pat. No. 7,849,103.

(60) Provisional application No. 60/502,107, filed on Sep. 10, 2003.

(51) Int. Cl.
*G06F 17/30* (2006.01)

(52) U.S. Cl.
USPC ........... 707/812; 707/755; 707/792; 707/955; 709/223

(58) Field of Classification Search
None
See application file for complete search history.

(56) References Cited

U.S. PATENT DOCUMENTS

| | | | |
|---|---|---|---|
| 6,308,175 B1 | 10/2001 | Lang et al. | |
| 6,606,744 B1 | 8/2003 | Mikurak | |
| 6,697,824 B1 | 2/2004 | Bowman-Amuah | |
| 6,766,518 B1 * | 7/2004 | Bernstein et al. | 719/315 |
| 7,539,697 B1 * | 5/2009 | Akella et al. | 1/1 |
| 2002/0082901 A1 * | 6/2002 | Dunning et al. | 705/10 |
| 2002/0087320 A1 | 7/2002 | Lee et al. | |
| 2002/0138271 A1 | 9/2002 | Shaw | |
| 2003/0050977 A1 | 3/2003 | Puthenkulam et al. | |
| 2003/0101227 A1 | 5/2003 | Fink | |
| 2003/0158855 A1 | 8/2003 | Farnham et al. | |
| 2004/0122803 A1 * | 6/2004 | Dom et al. | 707/3 |

* cited by examiner

*Primary Examiner* — Shyue Jiunn Hwa
(74) *Attorney, Agent, or Firm* — Edwards Wildman Palmer LLP; David J. Silvia; Joshua L. Jones

(57) ABSTRACT

A computer implemented method of processing data containing information about relationships between contacts and a community of contact owners is provided, which includes the steps of: collecting data having contact information, contact owner information and one or more values related to the strength of a relationship between the contact and the contact owner; evaluating the strength of the relationship based on the one or more values; and storing the collected data and evaluated strength in a computer database.

18 Claims, 5 Drawing Sheets

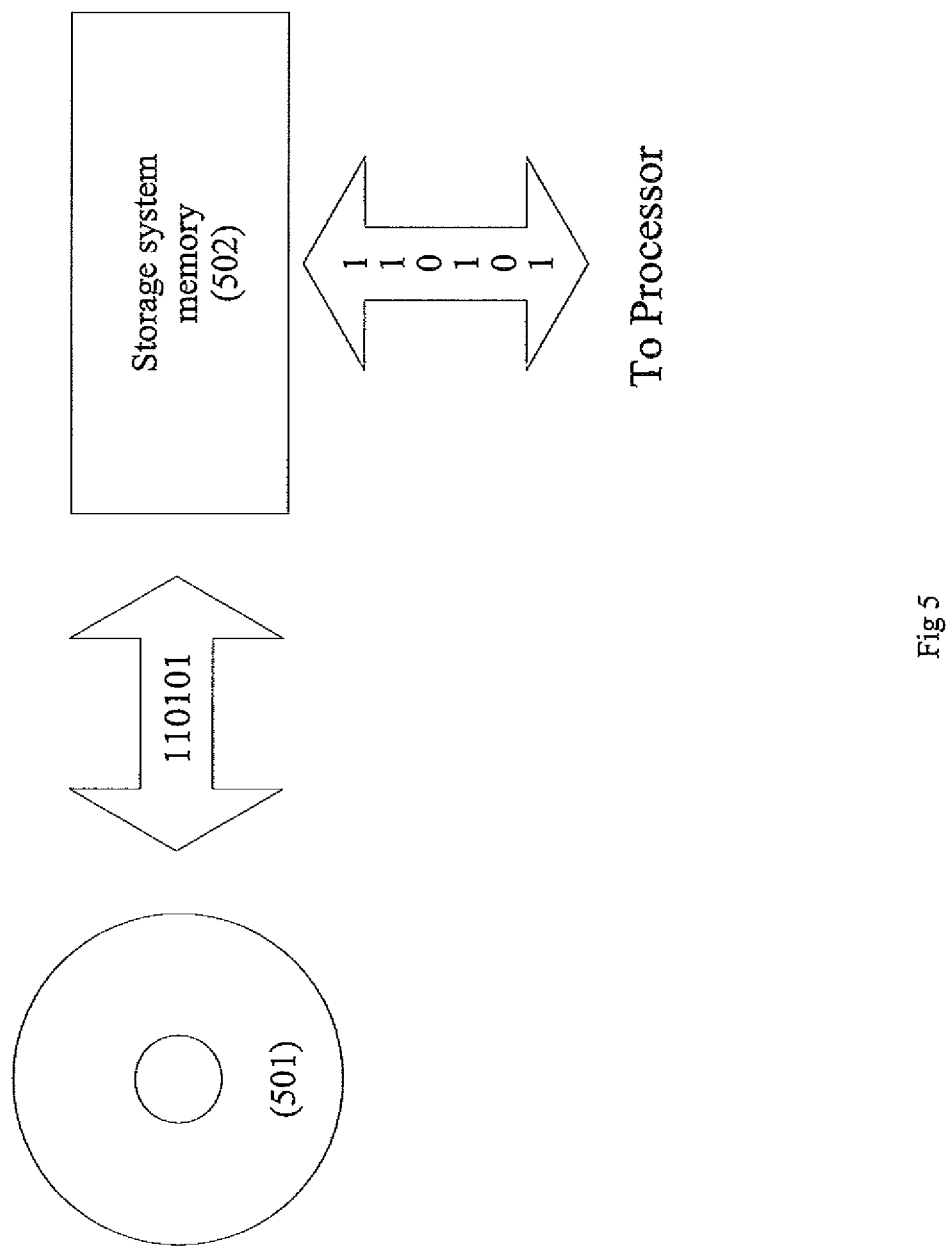

RELATIONSHIP COLLABORATION SYSTEM

RELATED APPLICATIONS

This application is a continuation of U.S. patent application Ser. No. 10/938,406 which claims priority under 35 U.S.C. §119(e) to U.S. Provisional Application Ser. No. 60/502,107, entitled "Relationship Collaboration System," filed on Sep. 10, 2003, each of which is herein incorporated by reference in its entirety.

BACKGROUND OF INVENTION

In today's business environment information is of critical importance. But all information is not created equal and certain types of information are more important and more valuable than other types of information. One type of information which is highly valuable and highly prized is relationship information. A relationship is a piece of information that indicates an association or link between an individual or entity and another individual or entity. In the business environment, the most valuable type of relationship is a relationship that facilitates or supports the initiation and successful conclusion of a business dealing. Given that a transaction between two parties cannot begin until the parties are somehow brought together, relationships are vital pieces of information which can catalyze a business deal between two or more entities. For this reason, the relationship information held by an individual, an enterprise or a community is highly valuable.

The information about a particular individual or entity is contact information. The links between contacts are relationships. Commercial software providers have developed a number of different software tools that allow individuals and entities to manage their contacts, store their contacts, and share their contacts. Examples of such tools include Interaction, Outlook, and ACT. Some of these tools also have simple functionality to represent rudimentary relationship information, although they are typically time consuming to administer, difficult to set up and laborious to employ. Each typically requires that a new database be developed, maintained and serviced. For example, in Outlook relationships can be represented by notes in the body of contact cards stored in a public folder. Only then is the system available for users to search through to find relationships of interest.

Moreover, these systems fail to distinguish between a valuable relationship and a less valuable contact, unless a user has manually entered a suitable note to that effect. In other words, each relationship is treated the same; with no measure of relative strength. Consequently, when a user employs these tools it is difficult for the user to distinguish between relationships that are likely to be helpful, and relationships that are unlikely to be helpful.

An additional drawback with these existing systems is that they fail to provide desirable privacy protection for all participants in the system. Both the privacy provided and the flexibility in choosing privacy levels are inadequate. For example, the existing systems may sweep through the electronic address books of different individuals in an enterprise and take the collected information to form a database that is completely open: once the information is stored in the database any user can come and search that database to find a contact of interest and see the detailed contact information without informing the original 'owner' of that contact. As such, individuals are hesitant to put information into an electronic address book or other system that can get swept into a publicly available or enterprise wide contact system that will allow anyone to directly contact people they have personal relationships with. As individuals then use their electronic address book systems only for a portion of their contacts, the collected relationship information is incomplete.

The drawbacks of existing contact systems are troubling to any organization that would benefit greatly if it is able to better leverage the relationships that exist within its community. Contact manager systems do not adequately capture and rank relationships, they require manual entry and updating, and they do not provide adequate privacy protection for all participants. Current contact manager systems require substantial manual intervention, do not readily provide meaningful results, are difficult to search in a meaningful way and produce a subjective result. Using current technology, it is difficult to determine which contacts are identified with which entities, and which relationships are both valid and meaningful. These drawbacks, and others, make them poor tools for discovering contacts and relationships of participants in the network system.

SUMMARY OF INVENTION

Accordingly, there is a need in the art to provide a system that allows organizations to more fully realize and leverage the relationships that its members can provide.

Described herein are systems and methods for providing relationship collaboration systems that allow a user to identify whether a community has a member with a relationship of interest to that user. The systems then provide communication channels, and optionally anonymous channels, that allow the user to inform the contact owner of a request for an introduction, or for more information, and to provide the contact owner more background information about the purpose of the request.

As will be described more fully, the relationship collaboration systems and methods described herein are automated systems that are capable of accessing different databases maintained within the enterprise for the purpose of building a relationship database that can be employed in a manner that allows users to search for potentially valuable relationships that their colleagues may have, and also maintains a contact owner's ability to keep their contacts private and to choose when information about their contacts is shared.

The systems and methods also provide for a system capable of generating a relevant factor indicative or representative of the significance or strength of a particular relationship in the database. As such, the results of a query can be returned as a ranked list of colleagues, with the colleagues who are mostly likely to have valuable relationships, for example, earliest in the list.

In a further optional embodiment, the systems and methods described herein include user settings that allow a contact owner to control when access will be granted to their contacts. To this end, the systems and methods described herein can respond to a query for relationships from a user by generating a ranked list of contact owners that have what appears to be a relationship of interest to the user, and allowing the user to identify the contact owner and to request permission to use that contact. In a further optional embodiment, the contact owner list may be anonymous in that a pseudonym is provided to identify some or all contact owners, thereby protecting the identity of the contact owner from individuals wishing to solicit access or use of their contacts.

A computer implemented method of processing data containing information about relationships between contacts and a community of contact owners, comprises: collecting data including contact information, contact owner information and one or more values related to strength of a relationship between the contact and the contact owner; evaluating the strength of the relationship based on the one or more values; and storing the collected data and evaluated strength in a computer database. A method of keying a database, comprises: building a database of records, each containing information about an entity, and each of which include a domain name field; and setting the domain name field as a key field; whereby a record for an entity is found and uniquely identified by reference to a domain name. A method of keying a database, comprises: building a database of records, each containing information about an entity, and each of which include an email address field; and setting the email address field as a key field; whereby a record for an entity is found by reference to an email address. A method of keying a database, comprising: building a database of records, each containing information about an entity, and each of which includes a field holding an identifier uniquely associated with an entity by a convention of computer networking; and setting the field holding the identifier as a key field; whereby a record for an entity is found by reference to an identifier. A method of sharing contact information, comprising: maintaining a database of contact information records; selecting contact information according to a selection criterion; and returning selected contact information also complying with restrictions set in a set of hierarchical privacy policies.

There are other aspects of the invention that will be evident to the skilled artisan from the following description.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings:

FIG. 5 is a block diagram of the storage system of the computer system of FIG. 4.

DETAILED DESCRIPTION

Figure 1:
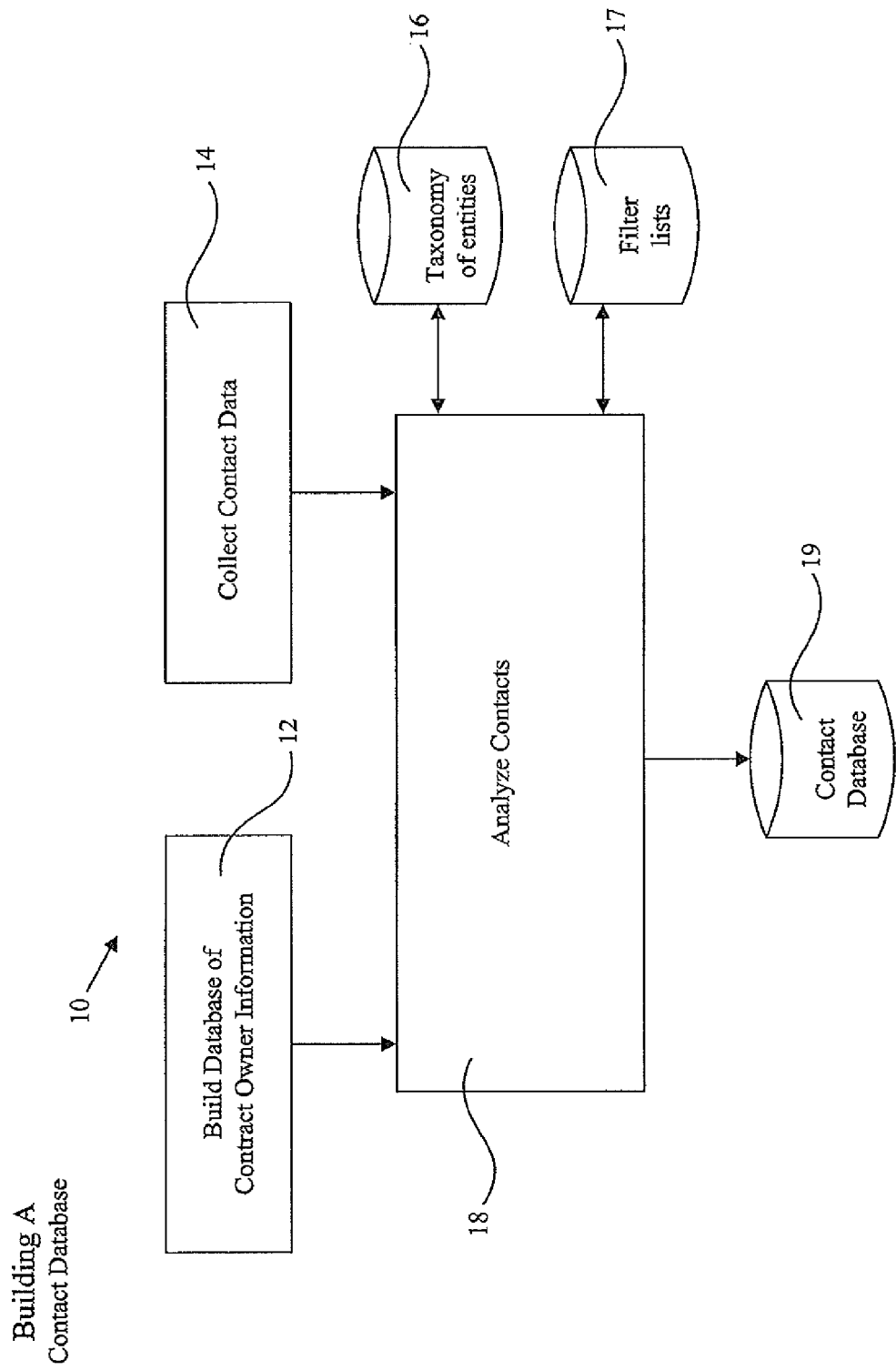
FIG. 1 depicts a flowchart diagram of one process for building a relationship database.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

The block diagram of FIG. 1 depicts an illustrative process 10 for building a relationship database. In process 10 contact data is collected and processed in order to create a relationship database 19. In operation 12, the process 10 collects information from sources held by or related to contact owners, for example, from an electronic address book that stores information such as the names of individuals and entities that are known to the contact owner. Sources typically include contact data about individuals and entities such as phone numbers, mailing addresses and email addresses and may also include some descriptive information such as an individual's job title and employer.

The illustrative process 10 also, in operation 12 may collect contact information from email traffic observations, web site visits and the like. The process 10 can, for example, monitor email traffic.

Email and other electronic communication traffic is routed to destinations from sources using structured identifiers such as email addresses and domain names. These identifiers conform to one or more conventions of computer networking to uniquely identify the destination and/or source of a particular message. Email addresses and domain names are conventionally associated with individual entities, for example, a person is referred to by an email address and a company by a domain name.

In a typical operation, the system will monitor email traffic associated with different contact owners and will record the email addresses to which correspondence was being sent and from which correspondence is being received. In this way, the process 10 in operation 14 can begin to analyze 18 the contact information and to build a database 19 of the different organizations with which members of their enterprise, i.e. the contact owners, are communicating. For example, email traffic may occur between members of the enterprise and organizations such as Microsoft, Fidelity, Wal-Mart, various colleges, and other such organizations and entities, hereinafter referred to collectively as entities. The domain name associated with the email addresses may be recorded during operation to create a comprehensive list of the domains with whom the members of the enterprise are communicating. Additionally, and optionally, the system can draw an association between different entities and different ones of the domain names being recorded, also including drawing an association between individual email addresses and individual persons.

The illustrative process 10 also, in operation 12 may collect and analyze information from other data sources, such as customer relationship management systems, biographical information such as resumes, other databases, phone logs, access logs for web browser clients, network traffic logs and contact data that can be used to establish relationships between contact owners and contacts as well as corresponding entities. This can include information such as resume or curriculum vitae (CV) information indicating other companies or organizations the contact owner has worked at before or schools that contact owner has attended, clubs they are affiliated with, and other such information. As such, contact owners are themselves part of the contact community and the information about them will be used to evaluate contact quality, as explained below.

Optionally, the classification information can be stored in a dynamically updated taxonomy database 16 of useful and/or not useful domains, email addresses and/or associated entities.

Optionally, the illustrative process 10 in operation 18 can filter the contact data, for example by domain name or email address data for the purpose of identifying domains and email addresses that are truly representative of relationships to those associated entities. For example, the system can go through and remove domains, such as Yahoo.com or Hotmail.com, that are associated with free email servers and not with organizations of potential interest to users who will query the relationship collaboration system. Additionally, the system can sort through and identify email addresses that represent the Amazon orders department, the Dell help desk and other email addresses that are not really representative of meaningful contacts at the entity associated with the domain of the email address. The filter list 17 against which contact information is filtered can be stored as a simple list, a set of topical rules, computer code, or database. In this way, operation 18 builds the relationship database 19 from email traffic observations that has been filtered to remove that traffic which provides little value or is potentially misleading to the relationship collaboration system.

Operation 14 collects information about the contact owners. Each person in the enterprise that may have a set of contacts or relationships which are available to be included in the relationship collaboration system is understood as a contact owner. The relationship database 19 is built by analyzing 18 the contact data 12 collected and associating relationships with contact owner information collected 14.

Operation 18 consolidates the different information collected by operations 12 and 14 into the relationship database 19, optionally using and also improving the taxonomy of entities 16 and the filter lists 17. This database 19 can then be queried by a user and the results can be scored and returned to the user.

Figure 2:
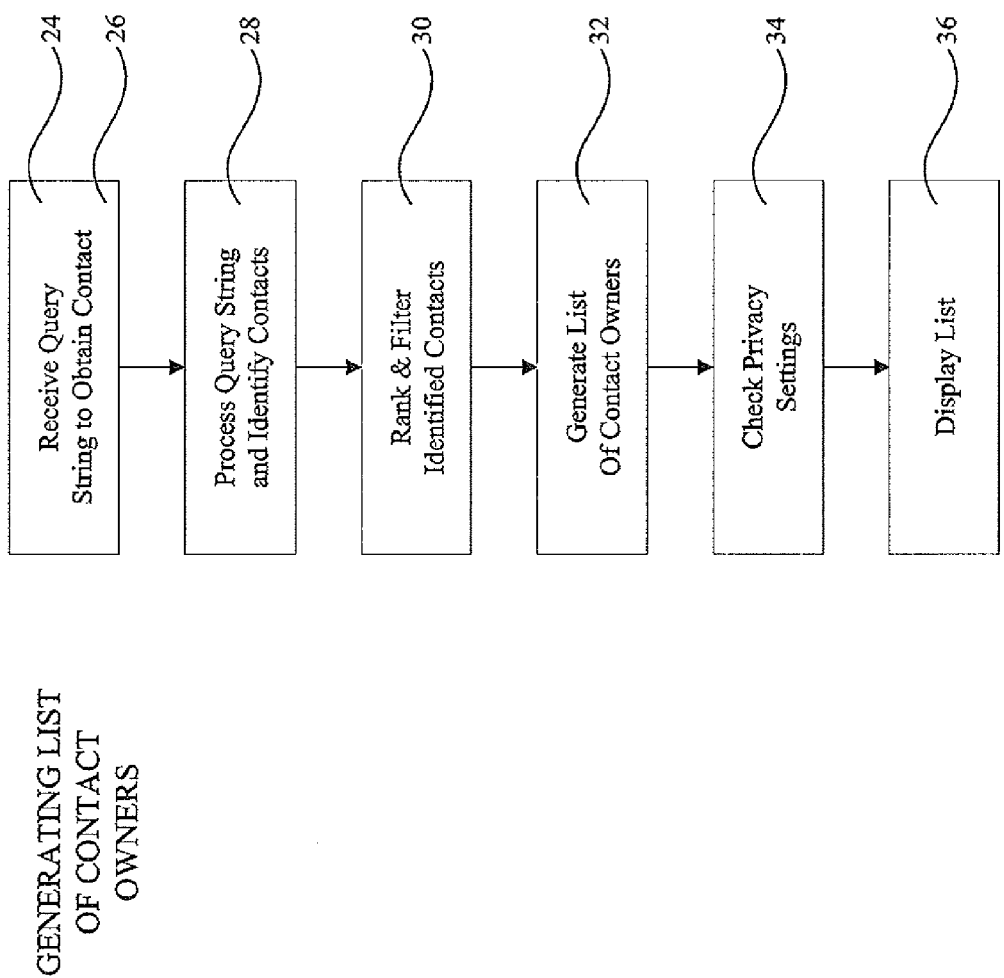
FIG. 2 depicts a flowchart diagram of one process for generating a list of contacts, relationships, or contact owners in response to a query.

Turning now to FIG. 2, one illustrative process for generating a list of contact owners is depicted. Specifically, FIG. 2 depicts an illustrative process 20 that begins at a first step 26 where the process 20 receives a query string to find a relationship. The query string can be any suitable query string, such as may be applied to search engines and databases, for example. The query string can be processed by any suitable process to identify a set of table searches that can be used for applying the query to the database to return a set of results which are associated with that query. For example, a user can enter a query based on a target individual's name, a company name, a title or role, an industry, a political party, a community is organization, a profession, a geography or any other kind of information that might be relevant to the user. The process 20 in step 26 can use that query to construct a formal query, i.e. a set of instructions, for example, SQL instructions or instructions in any suitable query language or format that can be applied to the database for the purpose of pulling the information that is relevant out of the database. In operation 28 the illustrative process 20 does just that and then it processes the query string and it uses it to identify a set of contacts stored in the database that are relevant to that query.

After operation 28 the illustrative process 20 proceeds to operation 30 wherein the relationships between each identified contact and each contact owner are scored according to the strength of those relationships and then ranked according to those scores.

The illustrative embodiment shown in FIG. 2, operation 30 scores the results by heuristically determining the relevance of the relationship between a contact owner and a contact. An example of a heuristic rule that might be used could be expressed as follows: if the contact data found in the address book of a particular contact owner is relatively old information, as determined for example by the date it was last modified, and yet from email traffic it can be seen that the contact owner still regularly communicates with that contact and from looking at the human resource information about that contact owner it can be seen that the contact owner used to be employed at an organization associated with that contact, then the relationship to an entity with which the contact is associated (by domain name, for example), may be deemed to be highly significant as the heuristic data indicates a strong relationship between the contact owner and the contact. Such a heuristic rule might be expressed algebraically as a linear relationship among the data in which data of different types may be weighted by different coefficients. Accordingly, when scoring relationships, operation 30 applies a set of algebraically expressed heuristic rules to score or rank the relationship information being stored in the database.

As described above, different heuristic rules can be applied, including heuristic rules that take into consideration how long the contact has been stored, how frequently it has been accessed, how recently it has been accessed or modified, whether the contact owner appears to have an identifiable association with the contact or entity, the type of association such as duration, frequency, recency or role, the amount and type of contact data, the pattern and frequency and recency of communication, and other such information. The set of rules can be updated adaptively using any suitable leaning process. It will also be apparent to those of skill in the art that any suitable set of adaptive or deterministic heuristic rules may be employed and the actual rules applied will vary according to the application. Thus the invention is not to be limited to any set of heuristic rules, whether deterministic or adaptive. The scoring of relationship strength can be done as a part of operation 30 or optionally it can be done in part or in whole in operation 18 of process 10, or optionally it can be done in part or in whole as a separate process.

In operation 30 the process 20 in addition to ranking the relationships based upon the computed quality, can also filter the ranked list for the purpose of removing from the identified relationships those relationships which fall below a particular threshold of relevance or quality. In this way, a reduced set of relationships is identified but these relationships are more likely to be meaningful and of interest to the user. After operation 30 the process 20 proceeds to operation 32 wherein the process generates a list of the contact owners associated with the different relationships. In this way a list is generated which optionally does not actually provide contact information to the user in response to their query but could instead give them pointers to the individual contact owners that have the contact information and may be willing to grant access.

In operation 34 the process 20 also checks privacy settings. The process 20 can determine whether a particular contact owner has decided to remain anonymous, either in total, or just in association with a particular contact or set of contacts. In this way, a contact owner that has a highly desirable contact may provide the information to the contact manager system without fear that he or she will be pressured to give access to a valuable, and perhaps sensitive, contact. In step 34, the actual contact owner's name can be removed entirely replaced with an anonymous key or pseudonym which does not identify the contact owner to the user but which can be used by the system for opening up a channel of communication between the user and the contact owner. A contact owner can subject themselves to a global privacy policy applied across an enterprise, a group policy, a personal policy, and a policy that defines when a particular contact's or entity's information and what parts of that information will be shared.

As an example, the global privacy policy may be nothing more than to mask the contact owner, as previously mentioned. The sales force group privacy policy may restrict access to any contact identified as a sales lead to members of the sales force group. An individual member of the sales force may choose to restrict access to a sensitive personal contact either entirely, or to reveal only their business information. The individual member of the sales force can set or clear privacy policy flags on groups of owned contacts, on individual owned contacts, or items of information in individual contacts or on types of information in individual contacts or groups of contacts. Global and group policies can be similarly varied, if desired.

In operation 36, the process displays this list of contact owner information, including reference to anonymous contact owners, to the user in response to their query. References to anonymous contact owners can include links to anonymous communication methods for requesting further information without breaking the contact owner's privacy. Optionally, the display list may also include some generic information about the different relationships such as its relevance, whether the contact owner has a personal or business relationship, whether the contact owner has a recent relationship or active relationship, the source or method by which the system is aware of the relationship, and other kinds of information. Also, this information may be used to sort the display list of contact owners. Optionally, the system may also display additional information about the contact owners, such as their title, office location, phone number and email address.

Figure 3:
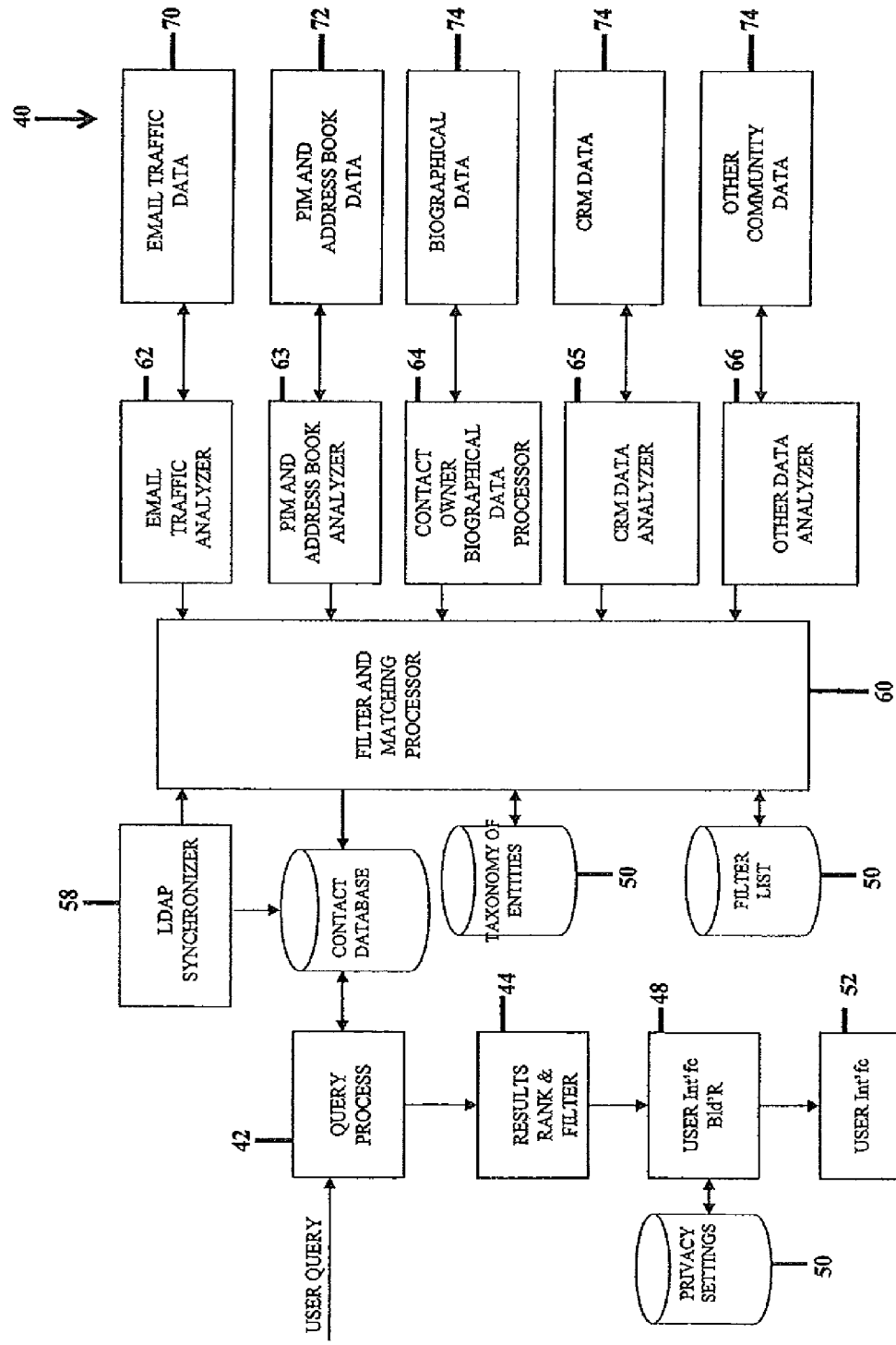
FIG. 3 depicts one embodiment of a system according to the invention for managing contacts on an enterprise wide basis.

FIG. 3 depicts a system 40 according to aspects of an embodiment of the invention for generating a relationship database 54 and for querying that relationship database 54 so that users can identify contact owners within their community that have relationships of interest to that user.

Specifically, FIG. 3 depicts a system 40 that includes a front end user interface system which includes a query process 42, a results rank and filter process 44, a user interface builder 48, a database of privacy settings 50, and a resultant user interface 52. As also shown in FIG. 3, the system 40 includes a relationship database 54 that includes the contact owner list 58 and is built in filter and match processes by a process 60. As further shown, the filter and match process receives information from an email analyzer 62, a personal information manager (PIM) and address book contact analyzer 63, a contact owner biographical data analyzer 64, a CRM data analyzer 65 and any other suitable data analyzers 66. These different processors coupled to different individual, community or enterprise data sources which are represented in FIG. 3 by data sources including email traffic data 72, electronic PIMs and address books 73, contact owner resumes or human resource (HR) database records 74, CRM data 75 and other community data 76. Any other suitable data sources of the desired scope can be used in addition or instead.

As described above with reference to FIGS. 1 and 2, the system 40 depicted in FIG. 3 is capable of supporting or implementing a set of processes that can process community or enterprise information, such as the data sources 72, 73, 74, 75 and 76 for the purpose of developing information of contacts and relationships which can be stored in the relationship database 54. In FIG. 3, the email analyzer 62, optionally with the filter and match processor 60, is capable of processing information from email data source 72 to determine the set of email addresses and domain names and therefore individuals or companies or entities or associated organizations with whom members of the community have a relationship. The email analyzer 62 can be a plug-in capable of plugging into Microsoft Outlook or Microsoft Exchange or some other email client or server program or it can be a program that analyzes log data generated by an email client or server program and it should be capable of sorting through email databases and logs of information to record the addresses and domains identified in email records, determine statistical information about the amount of contact with a particular address or domain, the duration of the contact, the time of the most recent contact, and other kinds of information which, when processed heuristically, may be used to get a sense of how robust or strong the contact owner's relationship with the entity associated with the email address or domain may be. The processor 60 also filters the list of email addresses and domains to determine those that are relevant to the contact database. Processor 60 can be used to filter and match various contact data and relationships using a taxonomy 55 and store them in a relationship database 54. Processor 60 can also update and improve the taxonomy 55 and the filter list 56.

Similarly, in the illustrative embodiment of FIG. 3 a contact analyzer 64 may be a software process that acts as a program connected to Microsoft Outlook or Microsoft Exchange or some other electronic address book or contact manager system that can process information stored within the data source 72 to identify a set of contacts that members of the community have included or identified as persons or entities with whom they have some contact information or relationship. Using the contact analyzer 64 may develop an association or relationship between different members of the community and different contacts.

FIG. 3 further depicts that in this embodiment the system 40 includes a biographical data analyzer 64. This data processor 64 incorporates individual resumes and communicates with the human resource data source 74 and collects information about the contact owners within the community. This information can include resume information, work history information, company account information, professional association information, and any other kind of information that may be helpful to the system 40 to determine heuristically or deterministically a relationship between the contact owner and a contact or entity.

FIG. 3 further depicts a CRM data analyzer 65 and other data analyzers 66 that also incorporate data and use a processor 60 to establish relationship metrics between contact owners and contacts and corresponding entities.

FIG. 3 depicts a contact owner synchronizer 58 that is used by the processor 60 to define the community of contact owners in the relationship database 54. The contact owner synchronizer 58 can use any standard user directory 59 such as Microsoft Active Directory, an LDAP directory, or a text file list of users.

Aspects of the processes of FIG. 3 described up to this point can be embodied in the arrangement discussed above in connection with FIG. 1, Aspects of the following processes of FIG. 3 can be embodied in the arrangement discussed above in connection with FIG. 2. The illustrative system 40 depicted in FIG. 3 also includes a front end 42 that is capable of processing a user query for the purpose of searching through the relationship database 54 and providing to the user a list of contact owners within their community that have a relationship that may be of interest to the user. As shown in FIG. 3, the front end can include a query process of the kind commonly employed for receiving a set of key words or search string from a user and for parsing that search string into a set of terms that can be applied to fields within the relationship database 54.

After the query process 42 applies the query to the relationship database 54, the results are returned and forwarded to the process 44 that sorts through the results of the search and ranks the results in an order that presents, in this embodiment, the most relevant and highest quality relationships first. Once the list is ranked, the process 44 may apply a filter that sorts through the ranked list of relationships and identifies those relationships which fall below a threshold of relevance or quality and therefore can be removed from the list. In this way a reduced number of relationships, all meeting certain quality standards, may be identified and used.

After process 44, the process 48 may take the results and generate a web page 52 that presents to the user the names of contact owners, or a unique identifier for a contact owner that is associated with a relationship appearing within the list generated by process 44. As shown in FIG. 3, in this illustrative embodiment, the process 48 accesses privacy settings stored in database 50 for the purpose of identifying those contact owners that wish to remain anonymous and any other sharing or restrictive rules that may be defined. To this end, the process 48 can identify a list of contact owners that are associated with the relationships found by process 44 and can generate a list that either includes a name of a contact owner or an identifier for a contact owner that hides the identity of the contact owner but identifies that contact owner to the system 40. Information can be hidden or exposed in accordance with the most restrictive applicable policy, for example.

Once that information is created by process 48, the user interface 52, e.g. a web page or other interface such as a program on the user's computer or a set of data to embed in another computer program, is created and presented to the user.

In one such web based system, the system 40 depicted in FIG. 3 comprises a network based system that includes a plurality of data sources that connect through a network, such as an enterprise local area network, or any suitable network to a server system containing the analyses, processors, databases and search result components. Client systems can also be used to send search queries and view results.

In one illustrative embodiment, the system 40 depicted in FIG. 3 is implemented as a relationship collaboration tool that allows a user to use a conventional internet browser client, such as the Microsoft Internet Explorer browser to enter queries and receive results to those queries.

The client systems can be any suitable computer system such as a PC workstation, a handheld computing device, a wireless communication device, or any other such device, equipped with a network client capable of accessing a network server and interacting with the server to exchange information with the server. In one embodiment, the network client is a web client, such as a web browser that can include the Netscape web browser, the Microsoft Internet explorer web browser, or a proprietary web browser, or web client that allows the user to exchange data with a web server, an ftp server, a gopher server, or some other type of network server. Optionally, the client and the server rely on an unsecured communication path, such as the Internet, for accessing services on the remote server. To add security to such a communication path, the client and the server can employ a security system, such as is any of the conventional security systems that have been developed to provide to the remote user a secured channel for transmitting data over the Internet. One such system is the Netscape secured socket layer (SSL) security mechanism that provides to a remote user a trusted path between a conventional web browser program and a web server. Therefore, optionally the client systems and the server system have built in 128 bit or 40 bit SSL capability and can establish an SSL communication channel between the clients and the server. Other security systems can be employed, such as those described in Bruce Schneir, *Applied Crytpography* (Addison-Wesley 1996).

The server may be supported by any suitable commercially available server platform such as a Sun Sparc™ system running a version of the Windows, Unix, Linux or other operating system and running a server, such as an SQL database server including any SQL, MS Access, or the like, capable of connecting with, or exchanging data with, one of the client systems. Computer systems and platforms suitable for embodying the invention are described more fully, below. In one embodiment, the server includes a web server, such as the Apache web server or any suitable web server. The web server listens for requests from client systems, and to in response to such a request, resolves the request to identify a filename, script, dynamically generated data that can be associated with that request and to return the identified data to the requesting client. The operation of the web server can be understood more fully from Laurie et al., *Apache The Definitive Guide*, O'Reilly Press(1997). The server may also include components that extend its operation to accomplish the transactions described herein, and the architecture of the server may vary according to the application.

The server may couple to the relationship database 54 that stores information representative of relationship information as well as information about a user's account, including passwords, user privileges, privacy settings and similar information. The depicted database may comprise any suitable database system, including the commercially available Microsoft Access database, or Microsoft SQL-Server or open source my SQL server, and can be a local or distributed database system. The design and development of database systems suitable for use with the system 40, follow from principles known in the art, including those described in McGovern et al., *A Guide To Sybase and SQL Server*, Addison-Wesley (1993). The database 54 can be supported by any suitable persistent data memory, such as a hard disk drive, RAID system, tape drive system, floppy diskette, or any other suitable system. The illustrative system 40 depicted in FIG. 3 includes a database device that is separate from the server station platform, however, in other embodiments the database device can be integrated into the server or, other suitable architectures can be used.

The System 40 described herein can be supported by a conventional data processing platform such as an IBM PC-compatible computer running the Windows operating systems, or a SUN workstation running a Unix operating system. Alternatively, the data processing system can comprise a dedicated processing system that includes an embedded programmable data processing system. The architecture selected can vary according to the application.

Accordingly, although FIG. 3 graphically depicts the relationship collaboration system as functional block elements, it will be apparent to one of ordinary skill in the art that these elements can be realized as computer programs or portions of computer programs that are capable of running on a data processor platform to thereby configure the data processor as a system according to the invention.

The software programs can be implemented as C language computer programs, or computer programs written in any high level language including C++, Fortran, Java or Basic.

Various embodiments according to the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, or any other suitable type of processor. It should be appreciated that one or more of any type computer system may be used to store, collect, process, rank and display contact information according to various embodiments of the invention. Further, the relationship collaboration system may be located on a single computer or may be distributed among a plurality of computers attached by a communications network.

A general-purpose computer system according to one embodiment of the invention is configured to perform any of the described relationship collaboration functions including but not limited to storing, collecting, processing, ranking and displaying contact information. It should be appreciated that the system may perform other functions, including network communication, and the invention is not limited to having any particular function or set of functions.

Figure 4:
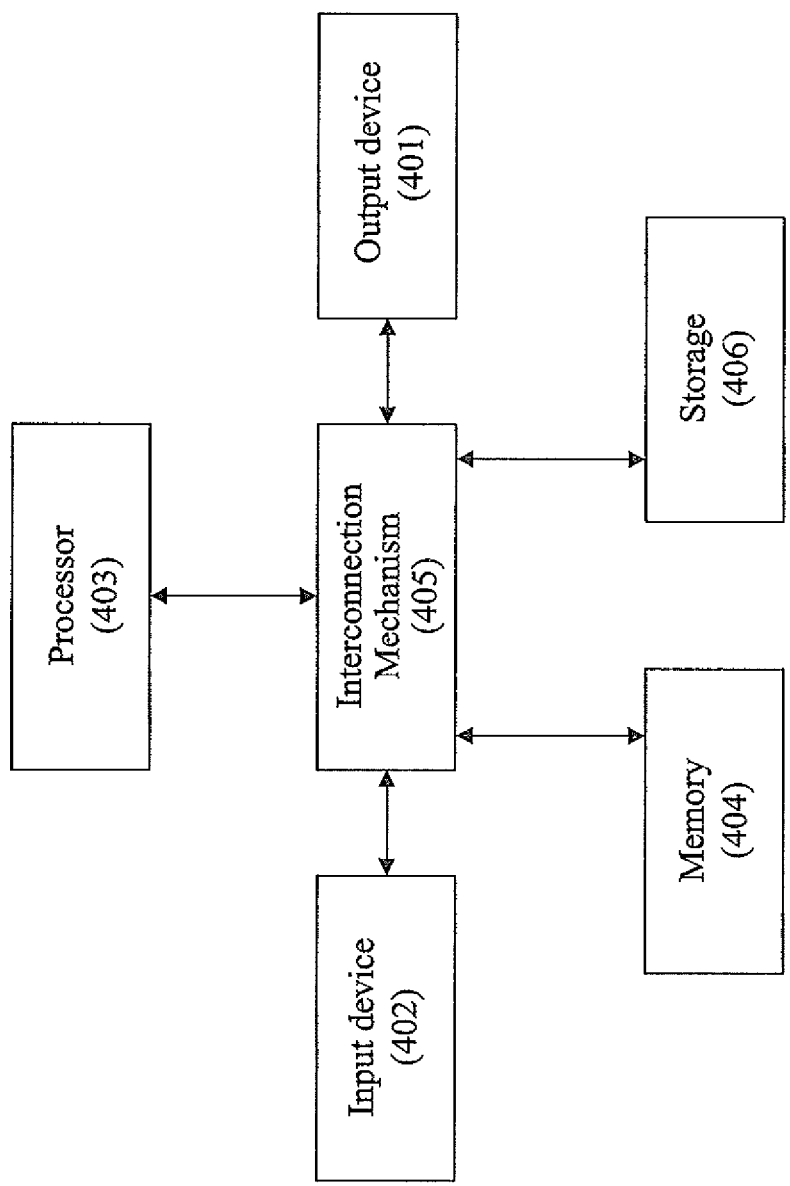
FIG. 4 is a block diagram of a computer system in which aspects of the invention may be embodied.

For example, various aspects of the invention may be implemented as specialized software executing in a general-purpose computer system 400 such as that shown in FIG. 4. The computer system 400 may include one or more processors 403 connected to one or more memory devices 404, such as a disk drive, memory, or other device for storing data. Memory 404 is typically used for storing programs and data during operation of the computer system 400. Components of computer system 400 may be coupled by an interconnection mechanism 405, which may include one or more busses (e.g., between components that are integrated within a same machine) and/or a network (e.g., between components that reside on separate discrete machines). The interconnection mechanism 405 enables communications (e.g., data, instructions) to be exchanged between system components of system 400.

Computer system 400 also includes one or more input devices 402, for example, a keyboard, mouse, trackball, microphone, touch screen, and one or more output devices 401, for example, a printing device, display screen, speaker. In addition, computer system 400 may contain one or more interfaces (not shown) that connect computer system 400 to a communication network (in addition or as an alternative to the interconnection mechanism 405.

The storage system 406, shown in greater detail in FIG. 5, typically includes a computer readable and writeable non-volatile recording medium 501 in which signals are stored that define a program to be executed by the processor or information stored on or in the medium 501 to be processed by the program. The medium may, for example, be a disk or flash memory. Typically, in operation, the processor causes data to be read from the nonvolatile recording medium 501 into another memory 502 that allows for faster access to the information by the processor than does the medium 501. This memory 502 is typically a volatile, random access memory such as a dynamic random access memory (DRAM) or static memory (SRAM). It may be located in storage system 406, as shown, or in memory system 404, not shown. The processor 403 generally manipulates the data within the integrated circuit memory 404, 502 and then copies the data to the medium 501 after processing is completed. A variety of mechanisms are known for managing data movement between the medium 501 and the integrated circuit memory element 404, 502, and the invention is not limited thereto. The invention is not limited to a particular memory system 404 or storage system 406.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 400 is shown by way of example as one type of computer system upon which various aspects of the invention may be practiced, it should be appreciated that aspects of the invention are not limited to being implemented on the computer system as shown in FIG. 1. Various aspects of the invention may be practiced on one or more computers having a different architecture or components that that shown in FIG. 4.

Computer system 400 may be a general-purpose computer system that is programmable using a high-level computer programming language. Computer system 400 may be also implemented using specially programmed, special purpose hardware. In computer system 400, processor 403 is typically a commercially available processor such as the well-known Pentium class processor available from the Intel Corporation. Many other processors are available. Processor 403 includes multiple processor systems, particularly including the multi-processing systems. Processors usually execute an operating system which may be, for example, the Windows 95, Windows 98, Windows NT, Windows 2000 (Windows ME) or Windows XP operating systems available from the Microsoft Corporation, MAC OS System X operating system available from Apple Computer, the Solaris operating system available from Sun Microsystems, the open source Linix operating system or UNIX operating systems available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server or multi-tier system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Those skilled in the art will know or be able to ascertain using no more than routine experimentation, many equivalents to the embodiments and practices described herein.

Accordingly, it will be understood that the invention is not to be limited to the embodiments disclosed herein, but is to be understood from the following claims, which are to be interpreted as broadly as allowed under the law. For example, aspects of the invention may be embodied in software operating on a general purpose computer or special purpose hardware, a special purpose hardware machine, or business methods, and instructions fixed in a machine-readable medium. The invention may also be embodied in a method of operating a computer, a computer network or other system as described above. Parts of the method may be performed by a customer and other parts by a service provider. Any suitable partitioning of the system or method may be used.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer implemented method comprising:
   collecting data from an electronic mail system including an electronic address book, the electronic address book associated with a contact owner and including a plurality of contacts and a corresponding set of contact information, the collected data including one or more values related to a strength of a relationship between the contact owner and one of the plurality of contacts, wherein at least one of the values is a quantity regarding email communications between the one of the plurality of contacts and the contact owner;
   determining a strength score representative of the strength of the relationship between the contact owner and the one of the plurality of contacts, with the strength score based on the quantity regarding email communications, wherein the step of determining the strength score includes analyzing a set of email traffic between one or more organizations and the contact owner;
   wherein the step of collecting data includes extracting from the one or more values a set of data indicative of one or more of timing, type, and amount of contact between the one of the plurality of contacts and the contact owner;
   extracting unique identifiers from the collected data;
   matching the unique identifiers to a taxonomy of valid entities;
   indexing the collected data to unique identifiers corresponding to valid entities,
   updating the taxonomy to include at least a portion of additional information extracted from the collected data;
   filtering the collected data and determined strength to exclude from the computer database collected data corresponding to insufficient strength;
   wherein the step of determining a strength score includes basing the strength score on the set of data indicative of one or more of timing, type, and amount of contact between the one of the plurality of contacts and the contact owner; and
   storing the collected data and the strength score in a computer database.

2. A computer implemented method as recited in claim 1, wherein extracting unique identifiers further comprises: recognizing an identifier associated with an entity by a convention of computer networking and recognizing domain names or email addresses as unique identifiers of entities.

3. A computer implemented method as recited in claim 1, further comprising:
   receiving a query for contacts having desired characteristics; and
   returning a list of contact owners corresponding to relationships with contacts or entities having the desired characteristics, wherein the list includes the contact owner.

4. A computer implemented method as recited in claim 3, further comprising:
   ordering at least a portion of the returned list of contact owners according to the strength score.

5. A computer implemented method as recited in claim 3, wherein the contact owner and their contacts having the desired characteristics satisfy a privacy policy including one or more policies selected from the group consisting of: a global policy, a group policy, an individual contact owner policy, an individual contact policy, and an opt-out privacy policy permitting the contact owner to respectively preclude information regarding one or more of the contacts from being listed in response to the received query.

6. A computer implemented method as recited in claim 5, the opt-out privacy policy permitting the contact owner to totally opt out, thereby precluding all information regarding all of the contacts from being listed in response to the received query.

7. A computer implemented method as recited in claim 3, wherein the electronic mail system includes a second electronic address book associated with a second contact owner and a second plurality of contacts and corresponding contact information, and wherein the method further comprises:
   rendering the second contact owner anonymous in the returned list; and
   providing access to anonymous communication with the anonymous contact owner.

8. A computer implemented method as recited in claim 3, further comprising:
   providing a communication method for contacting the contact owner on the returned list.

9. A computer implemented method as recited in claim 1, wherein the step of determining the strength score includes monitoring email traffic between the contact owner and the contacts within organizations.

10. A computer implemented method as recited in claim 1, wherein extracting from the one or more values data indicative of nature and amount of contact between the contact and the contact owner includes extracting one or more of how long the contact has been stored, how frequently it has been accessed, how recently it has been accessed or modified, whether the contact owner appears to have an identifiable association with the contact or entity, a type of association such as duration, frequency, recency or role, an amount and type of contact data, and a pattern and frequency and recency of communication.

11. A computer implemented method as recited in claim 1, further comprising computing on a substantially continuous scale, the strength of the relationship relative to a strength of relationship of at least one different contact owner.

12. A system for processing data containing information about relationships between contacts or entities and a community of contact owners, comprising:
   a data collecting module which collects data including contact information, contact owner information and one or more values related to strength of a relationship between a contact and the contact owner, wherein at least one of the values related to strength of a relationship is a quantity regarding email communications between a respective contact and the contact owner;
   a processor executing a process to evaluate the strength of the relationship based on the one or more values, including email communication values;

a memory storing the collected data and evaluated strength in a computer database;

a module which extracts from the one or more values a set of data indicative of one or more of timing, type, and amount of contact between the contact and the contact owner;

a module which analyzes a set of email traffic between one or more organizations and the contact owner;

a module which computes on a substantially continuous scale a strength score for the relationship relative to a set of other relationships in the collected data wherein the module which computes the strength score incorporates into the strength score analysis from the module which analyzes the set of email traffic;

a module which extracts unique identifiers from the collected data;

a module which matches the unique identifiers to a taxonomy of valid entities;

a module which indexes the collected data to unique identifiers corresponding to valid entities;

a module which updates the taxonomy to include at least a portion of additional information extracted from the collected data; and a module which filters the collected data and evaluated strength to exclude from the computer database collected data corresponding to insufficient strength.

13. A system for processing data containing information about relationships between contacts or entities and a community of contact owners as recited in claim 12, wherein the module which extracts unique identifiers further comprises: a sub-module which recognizes an identifier associated with an entity by a convention of computer networking and recognizes domain names or email addresses as unique identifiers of entities.

14. A system for processing data containing information about relationships between contacts or entities and a community of contact owners as recited in claim 12, further comprising:

a user interface which receives a query for contacts having desired characteristics; and a user interface which returns a list of contact owners corresponding to relationships with contacts or entities having the desired characteristics.

15. A system for processing data containing information about relationships between contacts or entities and a community of contact owners as recited in claim 14, further comprising:

a module which orders the returned list of contact owners according to the evaluated strength of relationships to those contacts or entities having the desired characteristics.

16. A system for processing data containing information about relationships between contacts or entities and a community of contact owners as recited in claim 14, further comprising:

a module which identifies contact owners corresponding to contacts having the desired characteristics only when the contact owner and contact also meet a privacy policy including one or more policies selected from the group consisting of: a global policy, a group policy, an individual contact owner policy, and an individual contact policy.

17. A system for processing data containing information about relationships between contacts or entities and a community of contact owners as recited in claim 12, further comprising a module which monitors email traffic between the contact owner and contacts within organizations.

18. A system for processing data containing information about relationships between contacts or entities and a community of contact owners as recited in claim 12, wherein the module which extracts from the one or more values data indicative of nature and amount of contact between the contact and the contact owner is configured to extract one or more of how long the contact has been stored, how frequently it has been accessed, how recently it has been accessed or modified, whether the contact owner appears to have an identifiable association with the contact or entity, a type of association such as duration, frequency, recency or role, an amount and type of contact data, and a pattern and frequency and recency of communication.

* * * * *